US009853465B2

(12) United States Patent
Biebach et al.

(10) Patent No.: US 9,853,465 B2
(45) Date of Patent: Dec. 26, 2017

(54) CONNECTING ELECTRICAL STORAGE DEVICES IN PARALLEL

(75) Inventors: Jens Biebach, Tutzing (DE); Friedrich Boebel, Eurasburg (DE)

(73) Assignee: Torqeedo GmbH, Starnberg (DE)

( * ) Notice: Subject to any disclaimer, the term of this patent is extended or adjusted under 35 U.S.C. 154(b) by 1076 days.

(21) Appl. No.: 13/402,622

(22) Filed: Feb. 22, 2012

(65) Prior Publication Data

US 2012/0217932 A1 Aug. 30, 2012

(30) Foreign Application Priority Data

Feb. 23, 2011 (EP) .................................. 11001501

(51) Int. Cl.
*H02J 7/00* (2006.01)
*H01M 10/44* (2006.01)
*H01M 10/0525* (2010.01)

(52) U.S. Cl.
CPC ......... *H02J 7/0024* (2013.01); *H01M 10/441* (2013.01); *H01M 10/0525* (2013.01)

(58) Field of Classification Search
CPC ...... H02J 1/10; H02J 1/102; H02J 2007/0039; H02J 2007/0067; H02J 7/0014;

(Continued)

(56) References Cited

U.S. PATENT DOCUMENTS 5,739,596 A * 4/1998 Takizawa et al. .............. 307/66
5,754,028 A * 5/1998 Vezzini ......................... 320/125

(Continued)

FOREIGN PATENT DOCUMENTS

DE   10 2009 012 908 A1   10/2009
EP        0 871 275 A2     10/1998

(Continued)

OTHER PUBLICATIONS

European Office Action issued in European counterpart application No. 12 001 170.5-1804 dated Mar. 21, 2017 (Five (5) pages).

*Primary Examiner* — Drew A Dunn
*Assistant Examiner* — David V Henze-Gongola
(74) *Attorney, Agent, or Firm* — Crowell & Moring LLP

(57) ABSTRACT

A circuit and a method for connecting a first electrical storage device and a second electrical storage device in parallel is disclosed. The first electrical storage device and the second electrical storage device have in each case a no-load voltage $U_{Bat1}$, $U_{Bat2}$ and an impedance $R_1$ and $R_2$, respectively, and have connecting terminals for charge withdrawal or charge supply. The no-load voltage $U_{Bat1}$ of the first storage device is greater than the no-load voltage $U_{Bat2}$ of the second storage device. In the case of a charge withdrawal, a charge is initially only withdrawn from the first storage device and the second storage device is connected in parallel with the first storage device when the difference of the voltage dropped across the connecting terminals of the first storage device and the no-load voltage $U_{Bat2}$ of the second storage device is less than a predetermined differential add-on voltage.

17 Claims, 3 Drawing Sheets

(58) Field of Classification Search
CPC ...... H02J 7/0018; H02J 7/0019; H02J 7/0024; H02J 7/0054; H02J 7/0068
USPC ................ 320/103, 104, 126–128, 134–136; 307/51, 64, 66, 67, 113, 115
See application file for complete search history.

(56) References Cited

U.S. PATENT DOCUMENTS

| | | | |
|---|---|---|---|
| 6,329,796 B1* | 12/2001 | Popescu | H02J 1/10 320/134 |
| 6,462,434 B1* | 10/2002 | Winick et al. | 307/85 |
| 7,847,429 B2 | 12/2010 | Miyama et al. | |
| 8,212,412 B1* | 7/2012 | Benedict et al. | 307/87 |
| 2004/0155627 A1* | 8/2004 | Stanesti | H02J 7/0018 320/127 |
| 2007/0107767 A1* | 5/2007 | Hayden | H02J 1/10 136/244 |
| 2007/0182371 A1* | 8/2007 | Boebel | 320/112 |
| 2009/0278497 A1* | 11/2009 | Kim | H02J 7/0016 320/126 |
| 2010/0201324 A1* | 8/2010 | Wang | G06F 1/203 320/134 |

FOREIGN PATENT DOCUMENTS

| | | | | |
|---|---|---|---|---|
| EP | 1 811 592 B1 | 7/2007 | | |
| JP | EP 0871275 A2 * | 10/1998 | ............ | H02J 7/0024 |

\* cited by examiner

CONNECTING ELECTRICAL STORAGE DEVICES IN PARALLEL

This application claims the priority of European Patent Document No. EP 11001501.3, filed Feb. 23, 2011, the disclosure of which is expressly incorporated by reference herein.

BACKGROUND AND SUMMARY OF THE INVENTION

The invention relates to a method for connecting a first electrical storage device and a second electrical storage device in parallel, the first electrical storage device and the second electrical storage device in each case having a no-load voltage $U_{Bat1}$, $U_{Bat2}$ and an impedance $R_1$ and $R_2$, respectively, wherein the first electrical storage device is connected to connecting terminals for charge withdrawal or charge supply via two first electrical conductors, wherein the electrical connection between the first storage device and one of the connecting terminals can be established or interrupted by means of a first switch, wherein the second electrical storage device is connected to the connecting terminals via two second electrical conductors, wherein the electrical connection between the second storage device and one of the connecting terminals can be established or interrupted by means of a second switch and wherein the no-load voltage $U_{Bat1}$ of the first storage device is greater than the no-load voltage $U_{Bat2}$ of the second storage device. Furthermore, the invention relates to a circuit of a first electrical storage device and a second electrical storage device, wherein the first electrical storage device is connected to connecting terminals for charge withdrawal or charge supply via two first electrical conductors, wherein a first switch is provided in one of the first electrical conductors, which interrupts or establishes the electrical connection between the first storage device and the connecting terminals, wherein the second electrical storage device is connected to the connecting terminals via two second electrical conductors, wherein a second switch is provided in one of the second electrical conductors, which interrupts or establishes the electrical connection between the second storage device and the connecting terminals.

The usability of non-stationary electrical loads such as, for example, electric drives, depends essentially on the capacity of the usable storage device for electrical energy. Typical energy storage devices for non-stationary applications are electric batteries, accumulators or capacitors.

It is characteristic of this class of energy storage devices that the state of charge in the unloaded state is correlated with a particular terminal voltage. Given the same storage technology and same state of charge, the volume of the storage device is linearly correlated with the stored quantity of energy, that is to say, the larger the storage device the greater the energy stored in it.

Apart from cost aspects, the maximum energy content of a storage device also has mechanical aspects. Under certain circumstances, certain dimensions must not be exceeded in order to provide for the installation, e.g., in a vehicle, and the transportation of the storage device. Furthermore, limits are also set to the total mass by requirements derived from the handling and the transportation.

If the total energy requirement exceeds the limits of a storage device which are derived from the dimensions and the mass, several storage devices must be connected together. The necessity of connecting several storage devices together to form a large storage device can also be derived from the available installation space.

If the storage device is a battery, the latter is constructed of basic units, the battery cells. The energy content of a battery cell depends on the cell technology and the cell volume. By suitably selecting the number of cells and their interconnection to form so-called core packs, the energy content and the current carrying capability of the core pack can be arranged to be proportional to the number of cells.

Furthermore, it is possible to adapt the impedance of the battery to the impedance of the load by means of a suitable ratio of series connection to parallel connection of the core packs within a battery, i.e., the battery can be adjusted in such a manner that it is capable of delivering also the maximum current needed with the required energy content.

The energy content of the storage device can be increased by connecting several batteries in series and/or in parallel. In the case of a series connection of a number of batteries, however, the increased system voltage results in higher demands on the insulation and on the creepage distances and air gaps to which the design of the individual battery frequently does not correspond since its insulation system is exclusively adjusted to the voltage level of individual operation.

With a limited dielectric strength of the individual battery or of the loads to be connected, connecting several batteries in parallel is therefore considered as being the more suitable measure for increasing the energy content of the storage device. This also applies to storage devices consisting of accumulators or capacitors.

To meet various safety requirements, electrical storage devices are equipped with a battery switch. If the switch is deactivated, the accessible battery terminals are free of voltage.

When electrical storage devices are connected in parallel, terminals of identical polarity are connected to one another. This is unproblematic as long as at least N−1 battery switches are opened with N storage devices.

In the time in which the storage devices are not connected to the common bus bar, their voltage level can develop differently. Causes of this can be, for example, separate charging of different periods of time or also the different self-discharge when the storage device is not used over a relatively long period of time.

If the voltages of the storage devices are different, a current will flow from the storage device having the higher voltage to the storage device having the lower voltage after two storage devices are connected together, that is to say after the corresponding two battery switches have been closed, which current produces a charge equalization until the voltages are equal over both storage devices. This applies with the assumption that no load was connected to the parallel-connected storage devices across which the voltage is lower than the no-load voltage of the storage device having the lower charge. The magnitude of the current flow is defined by the voltage difference between the two storage devices and the series resistance. In the case where two identical storage devices are connected in parallel, double the internal resistance of one storage device is effective with respect to the equalizing current.

In the case of N storage devices connected in parallel, the equalizing current leads to turn-on losses at N−1 battery switches if the voltage of the battery to be connected differs from the voltage of the battery already connected or from the resultant voltage of the batteries already connected, respectively. When the switch of the first storage device is closed, no current flow takes place as yet since the difference voltage is still dropped across the second switch. If then the switch of the second storage device is closed, a powerless peak resulting as the product of the voltage drop across the switch and the effective equalizing current is produced until the steady-state forward resistance of the switch is reached. Due to the switching power loss occurring, the switching contacts are eroded. The switches must therefore be specified for a maximum current to be switched and for the character of the load. The equalizing current produces losses across the effective equivalent resistance of the storage devices so that a part of the stored energy is converted into heat during the process of charge equalization and thus of voltage equalization.

If two lithium manganese batteries have, for example, an internal resistance of 1 mOhm each and when these batteries are connected in parallel, their battery voltages differ by, for example, 10 volts, and therefore an equalizing current of 5000 A which can represent a high hazard potential, flows due to the very low internal resistance.

From EP 1811592 B1, a battery having a safety circuit is known which has a resistor in the connection between the battery cells and one of the battery poles and where a switch is arranged in parallel with the resistor, and where the switch is closed only when the current flowing between the battery cells and one of the battery poles drops below a predetermined minimum current.

It is the object of the present invention to propose a method for connecting two or more electrical storage devices in parallel, and a corresponding circuit which enables storage devices of different no-load voltage to be connected in parallel with a minimized loading of the switches involved, wherein the charge equalization between the storage devices is minimized or completely prevented. Equalizing currents flowing when two storage devices are connected together should be avoided or limited to a minimum, if possible.

It is a further object to present a method and a circuit which allow two electrical storage devices to be connected in parallel without or with only little interruption of the power withdrawal.

All, or at least a part of these objects are achieved by means of a method of the type mentioned initially, which is characterized in that during a charge withdrawal, the electrical connection between the first storage device and the connecting terminals is established by means of the first switch and the electrical connection between the second storage device and the connecting terminals is interrupted by means of the second switch so that initially charge is withdrawn only from the first storage device, and in that the electrical connection between the second storage device and the connecting terminals is established by means of the second switch when the difference between the voltage dropped across the connecting terminals of the first storage device and the no-load voltage of the second storage device is less than a predetermined differential add-on voltage.

A circuit according to the invention of a first electrical storage device and of a second electrical storage device, wherein the first electrical storage device is connected to connecting terminals for charge withdrawal or charge supply via two first electrical conductors, wherein a first switch is provided in one of the first electrical conductors which interrupts or establishes the electrical connection between the first storage device and the connecting terminals, wherein the second electrical storage device is connected to the connecting terminals via two second electrical conductors, wherein a second switch is provided in one of the second electrical conductors which interrupts or establishes the electrical connection between the second storage device and the connecting terminals, is characterized in that a first measuring instrument for detecting the voltage present on the battery side of the first switch between the two first electrical conductors and a second measuring instrument for detecting the voltage present on the battery side of the second switch between the two second electrical conductors are provided, wherein the first and the second measuring instrument are connected to a control unit which has a comparing unit for comparing the detected voltages and a drive of the first and/or second switch in dependence on the comparison.

Exactly the opposite is preferably carried out in the case of a charge supply: in the case of a charge supply, the electrical connection between the second storage device and the connecting terminals is first established by means of the second switch and the electrical connection between the first storage device and the connecting terminals is interrupted by means of the first switch so that initially only the second storage device is supplied with a charge. The electrical connection between the first storage device and the connecting terminals is established by means of the first switch only when the difference of the voltage dropped across the connecting terminals of the second storage device and the no-load voltage of the first storage device is less than a predetermined differential turn-off voltage.

By means of the measuring instruments, the instantaneous terminal voltage of the storage device or storage devices which are already connected to the load and the no-load voltage of the storage device to be added next can be detected. These values are compared with one another in the control unit. When these two values meet a predetermined condition, especially when they differ from one another by no more than a predetermined differential add-on voltage or differential turn-off voltage, the control unit drives the switch of the storage device to be added or to be turned off in order to close it or to open it. The circuit according to the invention thus allows the first or second storage device to be connected in parallel to form a common storage device or the first or second storage device to be decoupled from an existing parallel circuit in dependence on the terminal voltage and the no-load voltage of the first or second storage device.

In the text which follows, the term storage device means a storage device for storing electrical energy. In particular, a storage device is understood to be a battery, an accumulator or a capacitor. In accordance with the general linguistic usage, the term battery is also intended to comprise accumulators and rechargeable batteries within the context of the present application. The invention is used with particular advantage to connect lithium-ion-accumulators, particularly lithium-manganese accumulators in parallel since these batteries or accumulator types have a low internal resistance so that without use of the invention in connecting these batteries/accumulators in parallel, high currents could flow. In particular, the invention is used for connecting in parallel storage devices, particularly batteries or accumulators, having the same nominal voltage.

The term connecting terminals is understood to mean the connections of the storage device via which charge can be withdrawn from or supplied to the storage device. The term terminal voltage characterizes the voltage present at these connecting terminals.

According to the invention, a switch is provided in one of the electrical connecting lines between the storage device and the connecting terminals. When the switch is opened, that is to say the electrical connection between the storage device and one of the connecting terminals is interrupted, the voltage dropped between the two electrical connecting lines on the battery side of the switch, that is to say the voltage dropped between the part-piece connecting the storage device and the switch of one electrical connecting line and the other electrical connecting line corresponds to the no-load voltage of the storage device. When the switch is closed, this voltage corresponds to the terminal voltage. Terminal voltage and no-load voltage can thus be determined by means of the same measuring instrument, the switch being closed in the first case and the switch being opened in the second case.

The switch establishes the electrical connection between the associated storage device and its connecting terminals or interrupts them. When the switch is opened, the storage device and the connecting terminal connected to the connecting line with the switch are electrically decoupled from one another, i.e. there is no current-conducting connection. There is no electrical connection between the storage device and the corresponding connecting terminal in parallel with the electrical connecting line in which the switch is arranged, either. When the switch is opened, the connection between the storage device and the connecting terminal is therefore completely interrupted. In particular, no diode arranged in parallel or anti-parallel with the switch such as, for example, a parasitic diode or a resistor are provided via which current could flow under certain conditions.

It is essential to the invention that with a charge withdrawal, the adaptation of the voltages of the individual storage devices is brought about by loading the first storage device, i.e., the storage device first connected to the load. Conversely, during loading of the storage devices, the voltages of the individual storage devices are adapted by charging the second storage device which is connected first to the source in this case. The voltage adaptation is carried out not via a precharging resistor which, for example, could be connected between the first and the second storage device but by loading or charging the storage device connected first to the sink or source. According to the invention, neither precharging resistors nor diodes or similar components are provided in parallel with the switch. The storage device is either connected directly to the connecting terminals (with the switch closed) or separated completely from the connecting terminals (with the switch opened). In this manner, the power loss is kept as low as possible when storage devices are connected in parallel.

The electrical resistance of a storage device is called its impedance and impedance can have both dynamic and static components. In steady-state operation, the impedance corresponds to the internal resistance of the storage device. In this context, steady-state operation means that a constant current is delivered over several milliseconds and the change in temperature of the storage device, occurring within this time, is negligible.

The term load is understood to be an electrical load, particularly an electric motor which is supplied with electrical energy from the storage device or devices. In the wider sense, however, it can also be a load which does not consume any current but which supplies charge to the storage device or devices. If the latter meaning is meant, this will be expressly pointed out in the text which follows.

According to the invention, the storage devices are added in dependence on their no-load voltages. During a charge withdrawal, charge is initially withdrawn only from the first storage device having the higher no-load voltage. Essentially, the terminal voltage of the first storage device already added is adapted to the no-load voltage of the second storage device by means of the voltage drop across the internal resistance of the first storage device added first. In the case where the load current is not high enough for effecting an adequate voltage drop, the no-load voltages are adapted with time by discharging the first storage device.

In practice, this circuit is preferably implemented by providing a switch and a voltage measuring instrument for each storage device. The switch is arranged in one of the electrical connections between the storage device and one of the connecting terminals of the storage device. The voltage measuring instrument measures the voltage between the battery side of the switch, i.e. between the part-piece which connects the storage device and the associated switch, and the other connecting terminal of the storage device which is connected directly to the storage device without interposition of a switch. When the switch is opened and the corresponding storage device is thus separated from the connecting terminals or from one of the connecting terminals, respectively, the voltage measuring instrument measures the no-load voltage of the storage device. This is ensured by the fact that no further electrical connecting line is provided in parallel with the electrical connecting line having the switch. When the switch is closed, the voltage measuring instrument measures the terminal voltage of the storage device. When no load is connected to the connecting terminals, no-load voltage and terminal voltage are matched.

The differential add-on voltages during the discharging process and the differential add-on voltages during the charging process can be selected independently of one another. Both values can be both positive, negative and zero. The more the differential add-on voltage approaches the value of zero, the further the equalizing current also converges towards zero and the less is the load on the switch which implements the parallel connection. During discharging, the second storage device is connected in parallel in the case of a positive differential add-on voltage when the external terminal voltage, i.e. the voltage between the terminals to which the load is connected has fallen to a value which corresponds to the no-load voltage of the second storage device plus the amount of the differential add-on voltage. Conversely, in the case of a negative differential add-on voltage, the second storage device is connected in parallel when the external terminal voltage has fallen to a value which corresponds to the no-load voltage of the second storage device minus the amount of the differential add-on voltage. This correspondingly applies to the differential add-on voltage selected for the charging process.

Connecting two electrical storage devices in parallel is optimal when the voltage difference is zero or at least minimum at the time of paralleling. The smaller the voltage difference between the energy storage devices, the smaller the voltage drop across the switch closing last and the lower also the equalizing current to be expected so that the reduction in the voltage difference has a quadratic effect with respect to the reduction of the switch losses and thus also with respect to the reduction of the switch wear.

According to the invention, when two electrical storage devices are connected in parallel, the storage device having the higher no-load voltage is first connected to the electrical load.

The no-load voltage of a storage device can be determined with the load not connected to the storage device, for example by measuring the terminal voltage present at the connecting terminals of the storage device. Since, without a load, no current flows, there is no voltage drop across the internal resistance or across the impedance of the storage device, respectively, so that the terminal voltage is equal to the no-load voltage of the storage device.

If the storage device is connected to a load, the no-load voltage can be determined from the terminal voltage and the voltage dropped across the internal resistance of the storage device. The latter voltage drop can be calculated from the instantaneous current flow, for example, when the internal resistance is known. In a preferred embodiment, therefore, a current measuring instrument is provided for detecting the current flowing from or to the first and/or second storage device.

After the load is connected to the first storage device and possibly after the load has been turned on, charge is withdrawn from the first storage device. Depending on the power absorbed and the resultant current, a voltage drop occurs across the impedance of the first storage device by which the terminal voltage is reduced compared with the no-load voltage of the first storage device. In this phase, the load is exclusively supplied with electrical energy via the first storage device.

Apart from the fact that the terminal voltage of the first storage device approaches the no-load voltage of the second storage device due to the voltage drop across the internal resistance of the first storage device, it is also achieved that the first storage device which supplies the current is discharged so that the no-load voltages of the first and of the second storage device become matched with time.

If the first storage device is sufficiently highly loaded, i.e., sufficient current is withdrawn from the first storage device, the voltage dropped across the connecting terminals of the first storage device can approach the no-load voltage of the second storage device by less than a predetermined differential add-on voltage.

When the terminal voltage of the first storage device and the no-load voltage of the second storage device have become matched apart from the differential add-on voltage, the second storage device can be connected in parallel with the first storage device with only little power loss and without greater loading of the switches so that the load is consequently supplied with energy from the first and the second storage device.

A maximum permissible current may be defined for the storage devices. If this current is exceeded, there is a risk that the storage device is damaged. A controller is therefore advantageously provided which ensures that the current drawn from the storage devices does not exceed the maximum current of the respective storage device. This is of significance particularly in the first phase in which the current is exclusively delivered by the first storage device. It is therefore advantageously monitored that the current does not exceed the maximum current of the connected storage devices, particularly of the first storage device.

The second storage device is connected in parallel with the first storage device by closing a switch. Since the switch needs a particular time for the closing process, it is advantageous if the current drawn from the first storage device, at which the voltage drop across the internal resistance of the first storage device has the desired value, is kept constant during the switching process. Since the time needed for this is within a range of milliseconds, a corresponding delay in the drive train of a vehicle is not noticeable, for example when an electrical drive system is supplied.

When the load current is increased further, a charge is withdrawn also from the second storage device. Assuming identical storage devices having identical temperatures and identical recovery state, the current from the first storage device will increase by the same amount as the current from the second storage device. However, both storage devices are still loaded by different amounts so that the first storage device is discharged more than the second storage device and the no-load voltages of both storage devices become matched.

When the load power is reduced, the current drops and the terminal voltage, i.e., the voltage between the connecting terminals to which the load is connected, increases. When the terminal voltage becomes greater again than the no-load voltage of the second storage device, it becomes both possible to retain the parallel connection of the first and second storage device and to turn off the second storage device, that is to say to interrupt the current-conducting connection between the external connecting terminals to which the load is connected, and the second storage device. The second storage device is preferably turned off when the terminal voltage differs from the no-load voltage of the second storage device by a certain differential turn-off voltage and/or when the second storage device, due to the changing load conditions, now only delivers a negligible contribution or no contribution to feeding the load or when the second storage device even begins to absorb energy.

Since the second storage device is connected to the load in this situation, its no-load voltage cannot be measured directly. The no-load voltage is therefore advantageously determined from the terminal voltage and the voltage dropped across the internal resistance of the storage device. The latter voltage drop can be calculated from the instantaneous current flow, for example when the internal resistance is known.

Another possibility of determining the turn-off time of the second storage device consists in measuring the current from or to the second storage device and turning off the second storage device when this current drops below a predetermined maximum current.

During the turning-off, too, it is advantageous to keep the current constant during the turning-off of the second storage device.

However, turning off a storage device will take place at the earliest when the total current no longer exceeds the permissible current of an individual switch or storage device, respectively. Turning the second storage device off early immediately after the terminal voltage has exceeded the no-load voltage of the second storage device prevents losses which would result from the charge equalization between the storage devices.

The individual storage devices are advantageously added in dependence on voltage and turned off in dependence on current. The second storage device is added when the difference of the voltage dropped across the connecting terminals of the first storage device already connected to the load and the no-load voltage of the second storage device is less than a predetermined differential add-on voltage. Conversely, the turning-off, i.e., separating a storage device from the load, is preferably carried out in dependence on current. When the load is reduced, the second storage device is preferably disconnected, i.e., the associated second switch is opened when the current from or to the second storage device drops below a predetermined value.

In a further preferred embodiment, signals are exchanged with a load circuit which is used for controlling the load which is supplied with a charge by the first and/or second storage device. The signals from the load circuit are at least also used for keeping the current flowing to or from the storage device(s) constant during the adding or turning-off of the first or second storage device. During the switching processes, the load current is kept constant in dependence on these signals and possibly in dependence on other quantities.

To avoid any instability of the system within the range of the switching point, it is advantageous to provide a hysteresis. Adding and disconnecting the storage device are carried out at different voltages. This means that the differential add-on voltage when a storage device is added differs from the differential turn-off voltage when the storage device is turned off.

The first storage device or the second storage device can in each case have a number of storage devices connected in parallel which are or were preferably connected in parallel analogously. That is to say the method according to the invention can also be advantageously used with more than two storage devices. Firstly, it is determined which storage device has the highest no-load voltage. This storage device is considered to be the first storage device in the sense of the invention and is turned on and loaded first. If the terminal voltage of this first storage device deviates by less than the differential add-on voltage from the no-load voltage of the storage device having the second highest no-load voltage, the second storage device is turned on.

When the loading increases further, the moment is awaited at which the common terminal voltage of the first and second storage device deviates from the no-load voltage of the storage device having the third-highest no-load voltage by less than the differential add-on voltage. The storage device having the third-highest no-load voltage is then also connected in parallel. This method can be repeated for any number N of storage devices. The storage devices already connected in parallel can here be considered as first storage device in the sense of the invention to which the storage device to be added next is connected additionally in parallel as second storage device in the sense of the invention.

In the case of several storage devices to be connected in parallel, identical differential add-on voltages are preferably selected in each case. This applies both to the discharging and to the charging process. The N-th storage device is in each case connected in parallel when the terminal voltage of the N−1 storage device which is already connected in parallel differs from the no-load voltage of the N-th storage device by a fixed differential add-on voltage. The differential add-on voltage is here the same independently of which storage device is added. However, it is also possible to select different differential add-on voltages for the (N−1) adding processes since the internal resistance decreases with each storage device connected in parallel so that the equalizing current would increase, the differential voltage remaining the same. The differential add-on voltage is therefore preferred to be indirectly proportional to the number of storage devices already connected in parallel.

The method according to the invention is preferably used also during the charging of the storage devices. For example, the invention allows the simultaneous charging of the first and second storage device (and possibly other storage devices) by means of a high-power charger. For example, the invention is advantageously also used in a recovery of braking energy. The above statements made in conjunction with the discharging of the storage devices apply analogously, the order of adding the storage devices being reversed. During the charging only the storage device having the lowest no-load voltage is first charged. When the terminal voltage of the storage device connected to the charger deviates from the no-load voltage of the storage device having the next-higher no-load voltage by less than a predetermined differential add-on voltage, this storage device is also connected in parallel and both storage devices are charged.

The differential add-on voltage during the charging process can be selected to be exactly as large as the differential add-on voltage during the discharging process. However, it is also possible to provide different differential add-on voltages during charging and discharging in order to meet the requirements of the characteristics of the charging and discharging process in a better manner.

Two electrical storage devices are optimally connected in parallel when the voltage difference is minimal at the time of the paralleling. Advantageously, a differential add-on voltage $V_d$ of:

$$V_d < I_{max} * R$$

is therefore selected, $I_{max}$ being the lower value of the maximum permissible current during the adding or turning-off of the second storage device 2 and of the maximum current which may be permissibly withdrawn from the first and/or second storage device 1, 2 and R is the resistance effective after the paralleling. $I_{max}$ represents the smaller value of the maximum permissible switch current and the maximum permissible battery current.

The value of the differential add-on voltage is particularly advantageously selected as:

$$V_d < 0.1 * I_{max} * R.$$

In the ideal case, no voltage difference between the terminal voltage of the first storage device and the no-load voltage of the second storage device during discharging or, respectively, between the terminal voltage of the second storage device and the no-load voltage of the first storage device during charging.

The invention is particularly suitable for connecting batteries or accumulators, particularly lithium-ion accumulators, especially lithium-manganese accumulators, in parallel. Lithium-ion accumulators have a very low internal resistance so that when such accumulators are connected in parallel, very large equalizing currents can flow even with low voltage differences. The invention avoids such equalizing currents or limits them, respectively.

The circuit according to the invention is advantageously used in electrical drive systems, particularly electrical boat driving mechanisms.

In the text which follows, the invention and further details of the invention will be explained in greater detail with reference to illustrative embodiments shown diagrammatically in the drawings.

DETAILED DESCRIPTION OF THE DRAWINGS

All figures are based on the following simplifying assumptions so that the essence of the invention can be represented in a better manner. The impedances or internal resistances and the no-load voltages of the storage devices are constant over the operating points considered. However, the invention is not restricted to this case.

Figure 1:
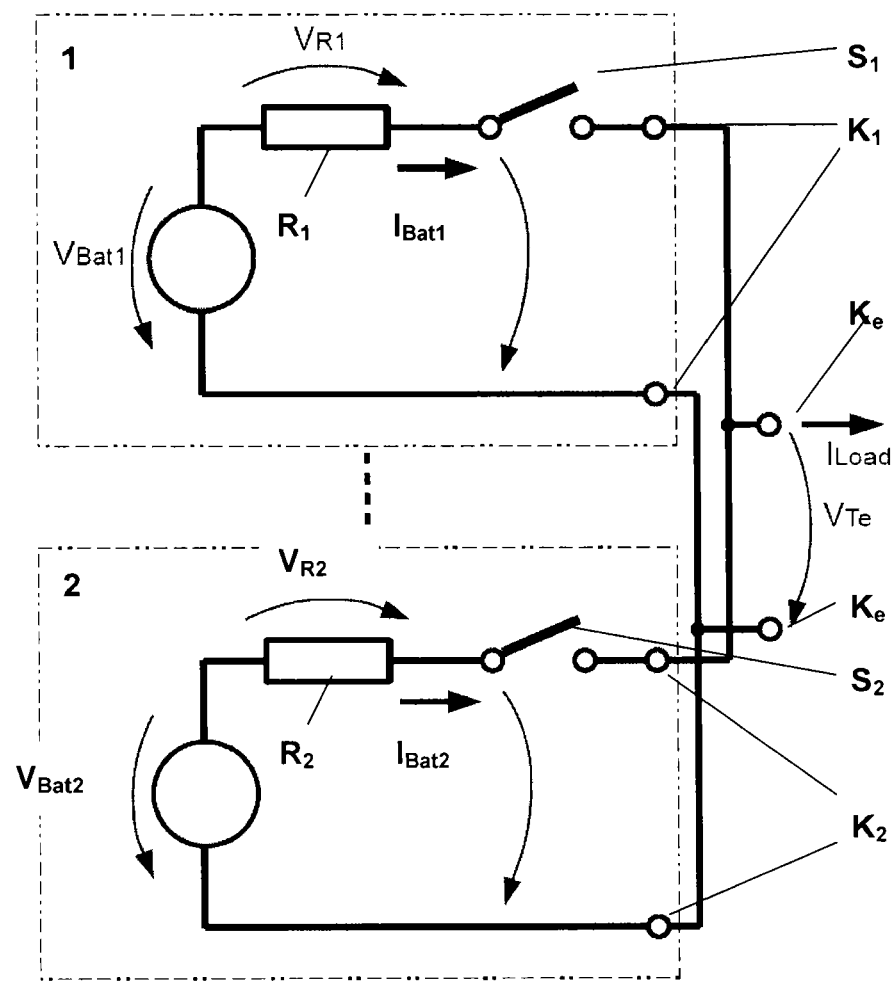
FIG. 1 shows the equivalent circuit of a parallel-connection of a number of lithium-ion batteries.

FIG. 1 shows the equivalent circuit of the parallel-connection of a first lithium-ion battery 1 with further lithium-ion batteries, only a second lithium-ion battery 2 being shown in the figure for the sake of clarity. In the text which follows, the invention and other advantageous embodiments of the invention are described by way of example with the parallel-connection of lithium-ion batteries or lithium-ion accumulators, respectively. However, the invention is not restricted to lithium-ion batteries and all embodiments can also be transferred to electrical storage devices of another type. As already noted initially, the term battery especially comprises also rechargeable batteries and accumulators.

The lithium-ion batteries 1, 2 have in each case a no-load voltage $V_{Bat1}$, $V_{Bat2}$, and an impedance $R_1$, $R_2$ across which a voltage $V_{R1}$, $V_{R2}$ is dropped when the lithium-ion battery 1, 2 is loaded. The batteries 1, 2 are in each case provided with a switch $S_1$, $S_2$ by means of which one of the connecting terminals $K_1$, $K_2$ can be connected in a current-conducting manner to the respective battery 1, 2 or disconnected from it. The connecting terminals $K_1$, $K_2$ are connected to the external terminals $K_e$ to which an electrical load, for example an electric motor, is connected.

For the considerations following, it is assumed that the no-load voltage $V_{Bat1}$ of the first battery 1 is greater than the no-load voltage $V_{Bat2}$ of the second battery 2.

Initially, only switch $S_1$ is closed so that the load is supplied exclusively with energy from the first battery 1. The terminal voltage $V_{Te}$ at the external terminals $K_e$ corresponds to the voltage at the connecting terminals $K_1$ of the first battery 1. As the current rises, the terminal voltage $V_{Te}$ at the external terminals $K_e$ drops. The curve designated by "Discharge 1" in FIG. 2 represents the variation of the terminal voltage $V_{Te}$ in dependence on the current to the load.

Figure 2:
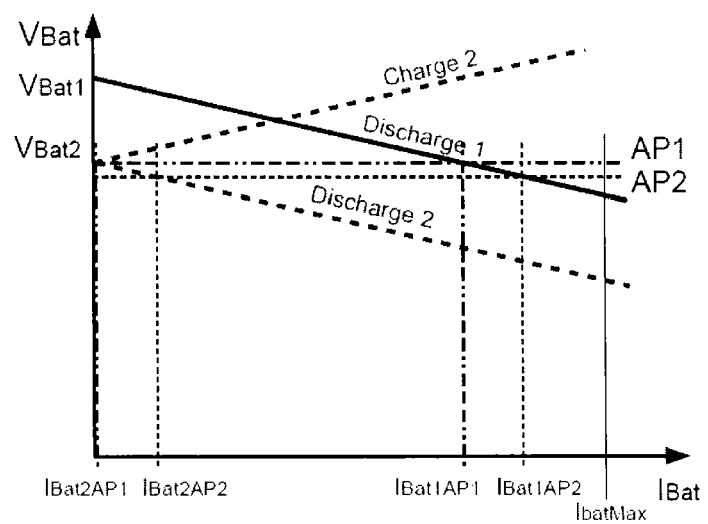
FIG. 2 shows the Ed characteristics in the parallel-connection according to the invention of two lithium-ion batteries.

The straight line AP1 in FIG. 2 represents the operating point at which the terminal voltage $V_{Te}$ has dropped by such an amount that it corresponds to the no-load voltage $V_{Bat2}$ of the second battery 2. In the present example, the differential add-on voltage has been selected as zero. When the terminal voltage $V_{Te}$ matches the no-load voltage $V_{Bat2}$, the voltage drop across the switch $S_2$ is zero and switch $S_2$ can be closed without power loss and without wear. Closing switch $S_2$ only lasts a few milliseconds. In this time, the load is controlled in such a manner that the flowing current remains constant.

At the operating point AP1, the second battery 2 does not yet supply any current to the load since the corresponding current is zero for the current voltage ratio. It is only when the load current increases further and thus the voltage $V_{Te}$ drops further (for example operating point AP2) that the current from both batteries 1, 2 increases by the same amount (see variation of the curves "Discharge 1" and "Discharge 2" in FIG. 2). Since the internal resistance effective with respect to the load has been halved by connecting both lithium-ion batteries 1, 2 in parallel, however, the voltage drop per increase in unit of power is only half as large as in the system which was operated with only one battery.

The load current flowing to the load is obtained as the sum of the two battery currents. Since both lithium-ion batteries 1, 2 are still loaded differently, battery 1 is discharged more than battery 2 so that the no-load voltages of both batteries 1, 2 become matched. The more the no-load voltages of batteries 1, 2 are matched to one another, the higher the total current which can be delivered by batteries 1, 2 since the contribution of the second battery 2 rises proportionally. This matching happens with terminal voltages $V_{Te}$ which are less than or equal to AP1 without charges being transported for this from the battery 1 having the higher no-load voltage to battery 2 having the lower no-load voltage.

Figure 3:
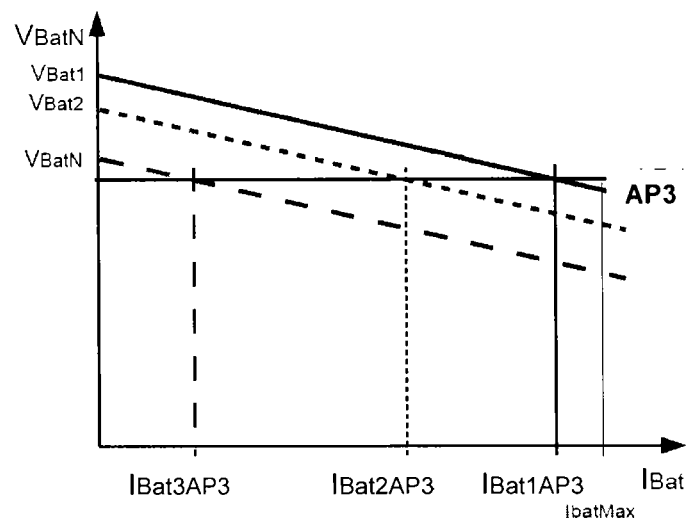
FIG. 3 shows the E/I characteristics in the parallel-connection according to the invention of three lithium-ion batteries.

The method is applied analogously with more than two batteries, 1, 2, N. In this case, it is also determined first which battery has the highest no-load voltage $V_{Bat}$. In FIG. 3, this is battery 1. Battery 1 is therefore turned on first and loaded. If the terminal voltage $V_{Te}$ has dropped to the no-load voltage $V_{Bat2}$ of battery 2 having the second highest voltage, this is turned on. When the loading increases further, the moment is awaited at which the common terminal voltage $V_{Te}$ corresponds to the no-load voltage $V_{Bat3}$ of battery 3 having the third highest voltage so that this can also be turned on. This method can be repeated for any number N of batteries. Naturally, this type of connecting several batteries in parallel is also possible with differential add-on voltages and not equal to zero but with higher loading of the switches.

FIG. 3 shows by way of example the division of current with the parallel-connection of N batteries at the operating point AP3. In this case, the load current $I_{Load}$ is calculated as:

$$I_{Load}=I_{Bat1AP3}+I_{Bat2AP3}+ \ldots +I_{BatNAP3}.$$

As long as the external terminal voltage $V_{Te}$ is below the lowest no-load voltage of the active batteries 1, 2, N, all batteries 1, 2, N deliver current exclusively into the load. Active batteries are those batteries, the associated switch of which is closed and which are electrically conductively connected to the external terminals $K_e$. If the power is reduced so that the external terminal voltage rises over one or more no-load voltages of the batteries already active, the batteries, the no-load voltage of which is below the terminal voltage, are charged, the current for this being delivered by the other batteries.

Figure 4:
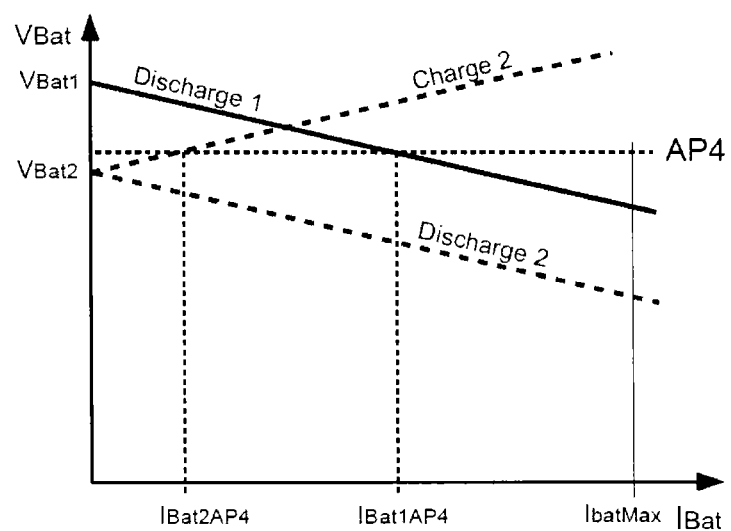
FIGS. 4 and 5 show the characteristics when utilizing a hysteresis.

FIG. 4 shows this for the case of two batteries 1, 2 connected in parallel. Both batteries 1, 2 have first been electrically conductively connected to the external terminals $K_e$, i.e., the respective switches $S_1$, $S_2$ were closed. This means the terminal voltage had dropped at least to the value of the no-load voltage $V_{Bat2}$ of accumulator 2 in the meantime. After reducing the power drawn by the load, the terminal voltage $V_{Te}$ has risen back to the operating point AP4. The no-load voltage $V_{Bat2}$ of battery 2 is then lower than the external terminal voltage $V_{Te}$, the no-load voltage $V_{Bat1}$ of battery 1 is higher than the external terminal voltage $V_{Te}$. Battery 1 then delivers both current for the load and for charging battery 2 and the original energy source battery 2 becomes an energy sink, i.e. a load. This charge equalization between batteries 1, 2 on reduction of the power provides the advantage that the maximum available current is reached faster.

However, the charge equalization when there is a reduction of the power, described above, also has the disadvantage that additional losses are produced by the current flowing from battery 1 to battery 2. The faster charge equalization is therefore bought with reduced range, for example when connecting an electrical drive system. It may also be advantageous, therefore, to turn off the battery or generally the storage device, the no-load voltage of which is below the external terminal voltage, i.e., to open the associated switch, after a reduction in the load power and an associated rise in the external terminal voltage. In this case, only those storage devices are connected in parallel and contribute to supplying the load with current, the no-load voltage of which is greater than the instantaneous terminal voltage, after a reduction of the power.

Figure 5:
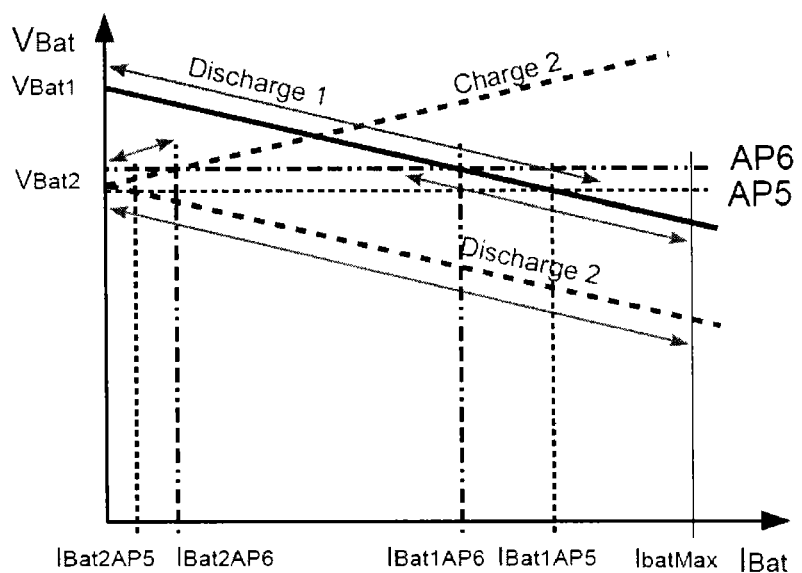

To prevent instability of the system within the range of the switching point, a hysteresis is provided. Adding and turning-off battery 2 or generally the storage device do not occur at the same voltage but at different voltages. Thus, for example, battery 2 is added, i.e., connected in parallel, when the external terminal voltage $V_{Te}$ corresponds to the no-load voltage $V_{Bat2}$ of lithium-ion battery 2. This corresponds to operating point 5 in FIG. 5. In contrast, battery 2 is only turned off when the terminal voltage $V_{Te}$ is above the no-load voltage $V_{Bat2}$ of the lithium-ion battery 2 by a certain value. In the example according to FIG. 5, this is the case at a terminal voltage corresponding to operating point 6. The terminal voltage $V_{Te}$ thus has to reach at least the no-load voltage $V_{Bat2}$ plus a certain differential turn-off voltage.

The hysteresis can also be reached, for example, by the add-on voltage being below the no-load voltage of the storage device to be added and the differential turn-off voltage being at the no-load voltage of the storage device to be disconnected. In this case, the differential add-on voltage is negative when the second storage device 2 is added and the differential turn-off voltage is equal to zero when the second storage device 2 is turned off.

Very advantageous conditions are obtained when the hysteresis is selected to be as small as possible and the hysteresis voltage difference is placed symmetrically about the no-load voltage of the storage device 2 to be added or turned off so that the adding takes place below the no-load voltage and the turning-off takes place above the no-load voltage of the storage device 2 to be activated/deactivated. The differential add-on voltage on adding the second storage device 2 and the differential turn-off voltage on disconnecting the second storage device 2 preferably have the same amount but are negative in the case of adding and positive in the case of disconnecting the second storage device 2, respectively. In the example according to FIG. 5, the hysteresis voltage difference corresponds to the difference of the voltages at the operating points AP5 and AP6. Adding takes place at operating point AP5 and turning-off takes place at operating point AP6.

The no-load voltage can only be determined with an unloaded battery. If charge is withdrawn from the battery or if charge is supplied to the battery, the no-load voltage changes. This also changes the optimum operating point for turning-off. To ensure that the switch current does not exceed the permissible limits on turn-off, the changing no-load voltage is suitably calculated in the loaded state of the battery by using a battery model. The no-load voltage of the battery to be turned off is preferably calculated by using a battery model.

As an alternative to the method described above by the differential voltage, the turning-off of the switches can also be controlled on the basis of the measurement of the battery current. Switching-off preferably takes place when the current through the switch to be operated is zero or close to zero. Having regard to the stability of the system states, switching-on and -off should follow a current hysteresis. Assuming that a motor current at which the battery absorbs energy, i.e., the battery is charged, is counted to be positive or has a positive sign, respectively, closing of the switch of the second storage device occurs at lower current values than opening of the switch. Closing and opening of the switch will preferably take place symmetrically to the current value of zero. With this action, in the case where energy is delivered to the load, the battery having the lower energy is turned off when its current has become motor-driven by a certain value, i.e., when the battery begins to absorb energy which happens when the no-load voltage of the battery is below the external terminal voltage.

During charging, this method is changed to the extent that the battery having the higher charge is turned off when its current begins to become generator-driven by a certain value, i.e., the battery begins to deliver energy.

In this context, the circuit of the first electrical storage device and of the second electrical storage device advantageously has a current measuring instrument per storage device for detecting the current flowing from or to the storage device. The current determined by the current measuring instrument is used as criterion for turning off the second storage device. The current measuring instrument measures the sign of the current, that is to say it determines whether the current flows to the second storage device or is drawn from the second storage device. Depending on whether the second storage device operates with a motor function or a generator function, the second storage device is decoupled from the connecting terminals. The amount of the current is advantageously additionally measured by the current measuring instrument and the disconnecting of the second storage device is also controlled in dependence on the amount of current.

In the case of a motor load, that is to say when a load is supplied with current, the second storage device can be disconnected from the first storage device and the load when a certain minimum current flows from the first storage device to the second storage device. The second storage device then no longer operates with a motor function but with a generator function. Conversely, the turning-off of the storage device to be turned off takes place at a certain motor-type current value with a generator-type load.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for connecting a first electrical storage device and a second electrical storage device in parallel:
   wherein the first electrical storage device and the second electrical storage device have a no-load voltage and an impedance, respectively;
   wherein the first electrical storage device is connected to connecting terminals for charge withdrawal or charge supply via two first electrical conductors, wherein an electrical connection between the first electrical storage device and one of the connecting terminals is establishable or interruptible by a first switch;
   wherein the second electrical storage device is connected to the connecting terminals via two second electrical conductors, wherein an electrical connection between the second electrical storage device and one of the connecting terminals is establishable or interruptible by a second switch;
   wherein when the first switch is open the electrical connection between the first electrical storage device and one of the connecting terminals is completely interrupted and wherein when the second switch is open the electrical connection between the second electrical storage device and one of the connecting terminals is completely interrupted;

wherein when an initial no-load voltage of the first storage device is greater than an initial no-load voltage of the second storage device;
comprising the steps of:
during a charge withdrawal:
the electrical connection between the first electrical storage device and the one of the connecting terminals is established by the first switch and the electrical connection between the second electrical storage device and the one of the connecting terminals is interrupted by the second switch so that initially charge is withdrawn only from the first electrical storage device;
the electrical connection between the second storage device and the one of the connecting terminals is established by the second switch when a difference between a terminal voltage of the first electrical storage device and the no-load voltage of the second electrical storage device is less than a predetermined differential add-on voltage;
wherein during the charge withdrawal when both electrical storage devices are connected, the second electrical storage device is separated from the first electrical storage device and from a load when a net current from the second electrical storage device does not exceed a certain discharge amount; and
wherein the predetermined differential add-on voltage is $V_d < I_{max} * R$, where $I_{max}$ represents a lower value of a maximum permissible current during an adding or turning-off of the second electrical storage device and of a maximum current which may be permissibly withdrawn from the first and/or second electrical storage device, and R represents an impedance of the electrical storage devices effective after the first and the second electrical storage devices have been connected in parallel.

2. The method according to claim 1:
wherein during a charge supply, when the initial no-load voltage is greater than the initial no-load voltage:
the electrical connection between the second electrical storage device and the one of the connecting terminals is established by the second switch and the electrical connection between the first electrical storage device and the one of the connecting terminals is interrupted by the first switch so that initially only the second electrical storage device is supplied with a charge; and
the electrical connection between the first electrical storage device and the one of the connecting terminals is established by the first switch when a difference of a terminal voltage of the second electrical storage device and the no-load voltage of the first electrical storage device is less than the predetermined differential add-on voltage.

3. The method according to claim 1, wherein the first or the second electrical storage device have several electrical storage devices connected in parallel.

4. The method according to claim 1, wherein when more than two electrical storage devices are connected in parallel, the predetermined differential add-on voltage is adapted to an effective impedance of the parallel connected electrical storage devices.

5. The method according to claim 2, wherein the differential add-on voltage of an equal amount is selected in the charge withdrawal and the charge supply.

6. The method according to claim 2, wherein in the charge withdrawal, the charge withdrawn from the first electrical storage device per unit time is kept constant while the second electrical storage device is connected in parallel with the first electrical storage device, and wherein in the charge supply, the charge supplied to the second electrical storage device per unit time is kept constant while the first electrical storage device is connected in parallel with the second electrical storage device.

7. The method according to claim 6, wherein signals are exchanged with a load circuit for controlling a load or source, and wherein during a charge withdrawal the charge withdrawn from the first electrical storage device per unit time is kept constant in dependence on the signals, and wherein during a charge supply the charge supplied to the second electrical storage device per unit time is kept constant in dependence on the signals.

8. The method according to claim 2, wherein the second electrical storage device is separated from the first electrical storage device and from the load when a terminal voltage of the second electrical storage device deviates from the initial no-load voltage of the second electrical storage device by less than a predetermined differential turn-off voltage.

9. The method according to claim 8, wherein the predetermined differential turn-off voltage differs from the differential add-on voltage.

10. The method according to claim 9, wherein during the charge withdrawal, the predetermined differential turn-off voltage is greater than the predetermined differential add-on voltage and during the charge supply, the predetermined differential turn-off voltage is lower than the predetermined differential add-on voltage.

11. The method according to claim 10, wherein the predetermined differential add-on voltage and the predetermined differential turn-off voltage have a same amount but different signs.

12. The method according to claim 8, wherein the separation only takes place when a total current no longer exceeds a permissible current of the first electrical storage device.

13. The method according to claim 1, wherein the first and/or second electrical storage device are/is a battery.

14. An electrical circuit, comprising:
a first electrical storage device;
a second electrical storage device;
wherein the first electrical storage device is connected to connecting terminals for charge withdrawal or charge supply via two first electrical conductors, wherein a first switch is provided in one of the first electrical conductors which interrupts or establishes an electrical connection between the first electrical storage device and the connecting terminals;
wherein the second electrical storage device is connected to the connecting terminals via two second electrical conductors, wherein a second switch is provided in one of the second electrical conductors which interrupts or establishes an electrical connection between the second electrical storage device and the connecting terminals;
wherein when the first switch is open the electrical connection between the first electrical storage device and the connecting terminals is completely interrupted and wherein when the second switch is open the electrical connection between the second electrical storage device and the connecting terminals is completely interrupted;
a first measuring instrument for detecting a voltage present between the two first electrical conductors;
a second measuring instrument for detecting a voltage present between the two second electrical conductors;
a control unit, wherein the first and the second measuring instruments are connected to the control unit which has a comparing unit for comparing the detected voltages and wherein the control unit controls the first and/or second switch in dependence on the comparison;

wherein during the charge withdrawal when both electrical storage devices are connected, the second electrical storage device is separated from the first electrical storage device and from a load when a net current from the second electrical storage device does not exceed a certain discharge amount;

wherein an electrical connection between the second electrical storage device and the connecting terminals is established by the second switch when a difference between a terminal voltage of the first electrical storage device and the no-load voltage of the second electrical storage device is less than a predetermined differential add-on voltage, and wherein the predetermined differential add-on voltage is $V_d < I_{max} * R$, where $I_{max}$ represents a lower value of a maximum permissible current during an adding or turning-off of the second electrical storage device and of a maximum current which may be permissibly withdrawn from the first and/or second electrical storage device, and R represents an impedance of the electrical storage devices effective after the first and the second electrical storage devices have been connected in parallel.

15. The circuit according to claim 14, further comprising a current measuring instrument for detecting a current flowing from or to the first and/or second electrical storage devices.

16. A method for connecting a first electrical storage device and a second electrical storage device in parallel:

wherein the first electrical storage device and the second electrical storage device have a no-load voltage and an impedance, respectively;

wherein the first electrical storage device is connectable to connecting terminals for charge withdrawal or charge supply via a first switch;

wherein the second electrical storage device is connectable to the connecting terminals via a second switch;

wherein when an initial no-load voltage of the first electrical storage device is greater than an initial no-load voltage of the second electrical storage device;

wherein when the first switch is open the electrical connection between the first electrical storage device and the connecting terminals is completely interrupted and wherein when the second switch is open the electrical connection between the second electrical storage device and the connecting terminals is completely interrupted;

comprising the steps of:

withdrawing a charge only from the first electrical storage device by establishing an electrical connection between the first electrical storage device and the connecting terminals by the first switch and interrupting an electrical connection between the second electrical storage device and the connecting terminals by the second switch;

following the step of withdrawing the charge only from the first electrical storage device, additionally withdrawing a charge from the second electrical storage device by establishing an electrical connection between the second electrical storage device and the connecting terminals by the second switch when a difference between a terminal voltage of the first electrical storage device and the no-load voltage of the second electrical storage device is less than a predetermined differential add-on voltage;

wherein during the charge withdrawal when both electrical storage devices are connected, the second electrical storage device is separated from the first electrical storage device and from a load when a net current from the second electrical storage device does not exceed a certain discharge amount; and wherein the predetermined differential add-on voltage is $V_d < I_{max} * R$, where $I_{max}$ represents a lower value of a maximum permissible current during an adding or turning-off of the second electrical storage device and of a maximum current which may be permissibly withdrawn from the first and/or second electrical storage device, and R represents an impedance of the electrical storage devices effective after the first and the second electrical storage devices have been connected in parallel.

17. The method according to claim 16 further comprising the steps of:

when the initial no-load voltage of the first electrical storage is greater than the initial no-load voltage of the second electrical storage:

supplying a charge to only the second electrical storage device by establishing the electrical connection between the second electrical storage device and the connecting terminals by the second switch and interrupting the electrical connection between the first electrical storage device and the connecting terminals by the first switch; and following the step of supplying the charge to only the second electrical storage device, additionally supplying a charge to the first electrical storage device by establishing the electrical connection between the first electrical storage device and the connecting terminals by the first switch when a difference of a terminal voltage of the second electrical storage device and the no-load voltage of the first electrical storage device is less than the predetermined differential add-on voltage.

* * * * *